(12) United States Patent
Li

(10) Patent No.: US 12,440,186 B2
(45) Date of Patent: Oct. 14, 2025

(54) SYSTEM AND METHOD FOR ULTRASOUND ELASTOGRAPHY AND METHOD FOR DYNAMICALLY PROCESSING FRAMES IN REAL TIME

(71) Applicant: SHENZHEN MINDRAY BIO-MEDICAL ELECTRONICS CO., LTD., Shenzhen (CN)

(72) Inventor: Shuangshuang Li, Shenzhen (CN)

(73) Assignee: SHENZHEN MINDRAY BIO-MEDICAL ELECTRONICS CO., LTD., Shenzhen (CN)

( * ) Notice: Subject to any disclaimer, the term of this patent is extended or adjusted under 35 U.S.C. 154(b) by 379 days.

(21) Appl. No.: 17/967,728

(22) Filed: Oct. 17, 2022

(65) Prior Publication Data

US 2023/0039463 A1 Feb. 9, 2023

Related U.S. Application Data

(63) Continuation-in-part of application No. 16/262,665, filed on Jan. 30, 2019, now abandoned, which is a
(Continued)

(51) Int. Cl.
*A61B 8/00* (2006.01)
*G06T 7/00* (2017.01)

(52) U.S. Cl.
CPC .............. *A61B 8/485* (2013.01); *A61B 8/463* (2013.01); *A61B 8/5223* (2013.01);
(Continued)

(58) Field of Classification Search
CPC ....... A61B 8/485; A61B 8/463; A61B 8/5223; G06T 2207/10016; G06T 2207/10024;
(Continued)

(56) References Cited

U.S. PATENT DOCUMENTS 2,682,766 A 7/1954 Van Valkenburg
2,763,153 A 9/1956 Simjian
(Continued)

FOREIGN PATENT DOCUMENTS

CN 101999907 A 4/2011
CN 102327132 A 1/2012
(Continued)

*Primary Examiner* — Joel F Brutus
(74) *Attorney, Agent, or Firm* — PV IP PC; Wei Te Chung

(57) ABSTRACT

Disclosed are a system and a method for ultrasound elastography and a method for dynamically processing frames in real time. The system includes an elasticity processing apparatus having an elasticity information detecting module for extracting elasticity information representing the elasticity of a target to be detected; a quality parameter calculating module for calculating at least a quality parameter reflecting quality of each elasticity image corresponding to the elasticity information; and a frame processing module for determining whether to output corresponding elasticity image based on the quality parameter of each elasticity image. When calculating a strain of consecutive images, the parameter reflecting the quality of each image is also computed, through which, the current elasticity image is determined whether to be displayed, thus avoiding the situation that colors of acquired successive elasticity images may vary greatly due to large difference existing in stress.

20 Claims, 6 Drawing Sheets

Related U.S. Application Data continuation-in-part of application No. 14/724,683, filed on May 28, 2015, now abandoned, which is a continuation of application No. PCT/CN2013/083880, filed on Sep. 22, 2013.

(52) U.S. Cl.
CPC .. *G06T 7/0014* (2013.01); *G06T 2207/10016* (2013.01); *G06T 2207/10024* (2013.01); *G06T 2207/10132* (2013.01); *G06T 2207/30004* (2013.01); *G06T 2207/30168* (2013.01)

(58) Field of Classification Search
CPC . G06T 2207/10132; G06T 2207/30004; G06T 2207/30168
See application file for complete search history.

(56) References Cited

U.S. PATENT DOCUMENTS

| | | |
|---|---|---|
| 6,014,473 A | 1/2000 | Hossack et al. |
| 2007/0093716 A1 | 4/2007 | Radulescu |
| 2009/0292205 A1 | 11/2009 | Osaka |
| 2011/0054314 A1 | 3/2011 | Tanigawa et al. |
| 2012/0016237 A1* | 1/2012 | Tanigawa .............. G01S 7/5206 600/438 |

FOREIGN PATENT DOCUMENTS

| | | |
|---|---|---|
| CN | 102824193 A | 12/2012 |
| JP | 2011101729 A | 5/2011 |
| WO | 2011102401 | 8/2011 |

* cited by examiner

SYSTEM AND METHOD FOR ULTRASOUND ELASTOGRAPHY AND METHOD FOR DYNAMICALLY PROCESSING FRAMES IN REAL TIME

CROSS-REFERENCE TO RELATED APPLICATIONS

This application is a continuation-in-part of a pending U.S. application Ser. No. 14/724,683, filed on May 28, 2015, which is a continuation of Patent Cooperation Treaty Application No. PCT/CN2013/083880, filed on Sep. 22, 2013, which claims priority to Chinese Patent Application No. 201210495184.14, filed on Nov. 28, 2012. These applications are hereby incorporated by reference.

TECHNICAL FIELD

The present disclosure relates to ultrasound imaging, and in particular to systems and methods for ultrasound elastography and methods for dynamically processing frames in real time in ultrasound imaging.

BACKGROUND

In ultrasound elastography, a commonly used ultrasound imaging technology, a target tissue is slightly compressed with a probe or a pressure is formed on the tissue by means of breathing or blood vessel to acquire two frames of an ultrasonic echo signal before and after the compression. A strain is generated along the direction of the compression within the tissue when the tissue is compressed, and the distribution of the strain in the tissue is varied due to uneven distribution of the Young's modulus inside the tissue. Thereafter, the strain of the tissue is detected through one or more techniques and outputted to an interface in the form of an image to help a doctor to diagnose or treat illnesses, such as breast cancer. Since the strain is inversely related to the Young's modulus under a pressure (or stress), for different soft tissues, the strain variations therebetween may reflect the dissimilarity of the Young's modulus therebetween, i.e., the elasticity difference. By use of an atlas (e.g., gray atlas or color atlas) for mapping, different strain values correspond to different colors, so that a qualitative judgment on the hardness of different soft tissues can be obtained through strain image to help in clinical diagnoses. Thus, ultrasound elastography is also known as strain imaging.

However, for a same tissue, the strain may be varied due to different stresses. Within a certain range, the greater the stress, the greater the strain. During one operation of compressing and relaxing the tissue evenly, the stress corresponding to every elasticity image may not be constant, and sometimes may even be quite different due to unfamiliar operation of a probe. Therefore, the colors can vary greatly among the acquired successive elasticity images (or strain images). In addition, too much stress may lead to too large deformation of the tissue and decreased correlation between two frames of the ultrasonic echo signal obtained before and after the compression, thus resulting in inaccurate calculated strain values. Less stress can lead to too small deformation of the tissue, which may be lower than the resolution of echo detected by an ultrasound system, thus resulting in poor image contrast. Accordingly, the elasticity images may be displayed unstably, which can cause difficulty in clinical judgment on the hardness of the tissue.

SUMMARY OF THIS DISCLOSURE

The present disclosure provides a system and a method for ultrasound elastography, and a method for dynamically processing frames in real time in ultrasound imaging.

According to one aspect of the present disclosure, a system for ultrasound elastography is provided, including an elasticity processing apparatus for performing an elasticity process to received signals. The elasticity processing apparatus may include: an elasticity information detecting module for extracting elasticity information representing the elasticity of a target to be detected; a quality parameter calculating module for calculating at least a quality parameter reflecting quality of each elasticity image corresponding to the elasticity information; and a frame processing module for determining whether to output corresponding elasticity image based on the quality parameter of each elasticity image.

According to another aspect of the present disclosure, a method for ultrasound elastography is provided, having an elasticity processing step for extracting elasticity information representing the elasticity of a target to be detected from received signals, calculating at least a quality parameter reflecting quality of each elasticity image corresponding to the elasticity information, and determining whether to output corresponding elasticity image based on the quality parameter of each elasticity image.

According to yet another aspect of the present disclosure, a method for dynamically process frames in real time in ultrasound imaging is provided, including: calculating at least a quality parameter reflecting the quality of each image; judging whether there exists a dynamic process start point frame. The dynamic process start point frame may be defined as a frame with quality parameter meeting preset quality requirement. If no dynamic process start point frame exists, judging whether the quality parameter of current image meets the preset quality requirement. If the quality parameter of current image fails to meet the preset quality requirement, the current image is not outputted; if the quality parameter of current image meets the preset quality requirement, the current image is outputted and regarded as the dynamic process start point frame. If the dynamic process start point frame exists, according to the result of judging whether the quality parameter of current image meets the preset quality requirement, determining whether to weight the current image and previous image and output the weighted result.

In the present disclosure, when calculating a strain of consecutive images, the parameter reflecting the quality of each image can also be computed, through which, the current elasticity image can be determined whether to be displayed. With no current elasticity image outputted, a message of recollecting images due to improper operation can be provided to a user; while with output the previous image as the current image, the displayed image can be an image with quality that meets preset requirement, thus avoiding the situation that colors of acquired successive elasticity images may vary greatly due to large difference existing in stress.

DETAILED DESCRIPTION

The present disclosure will be further described by the following detailed description of specific embodiments with the accompanying drawings.

First Embodiment

Figure 1A:
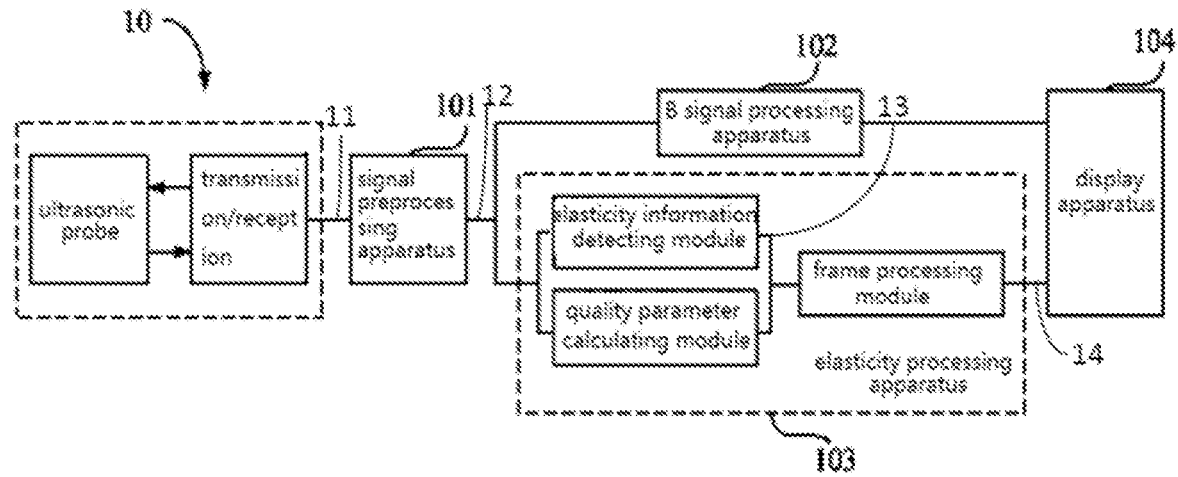
FIGS. 1A and 1B are schematic block diagrams of a system for ultrasound elastography.
Figure 1B:
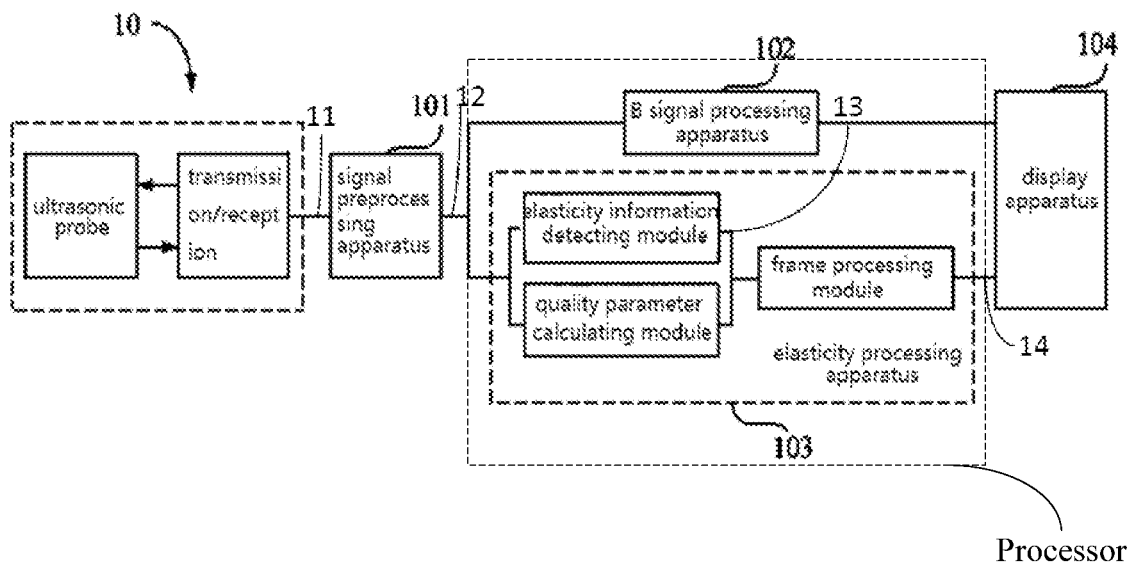

A system 10 for ultrasound elastography of this embodiment schematically shown in FIG. 1A may include an ultrasonic probe, a signal preprocessing apparatus 101, a B signal processing apparatus 102, an elasticity processing apparatus 103 and a display apparatus 104. The probe can emit an ultrasonic beam and receive ultrasonic echo signals based on a predefined scanning rule. The received echo signals can be preprocessed by the signal preprocessing apparatus 101, wherein the signal preprocessing may include beam forming process, and processes like signal amplification, analog-to-digital conversion and orthogonal decomposition can also be included. Radio frequency (RF) signal outputted by the signal preprocessing apparatus 101 can be passed to a plurality of parallel processing apparatuses including the B signal processing apparatus 102 and the elasticity processing apparatus 103, as well as other parallel processing modules such as flow signal processing module. As shown in FIG. 1B, those plurality of parallel processing apparatuses can be implemented by a processor. Image signals parallel processed by the B signal processing apparatus 102 and the elasticity processing apparatus 103 can be sent to the display apparatus 104 for outputting and displaying. The display apparatus 104 may display corresponding content based on a user's selection, for example, only displaying gray image of human tissue processed by the B signal processing apparatus 102, or only displaying elasticity image reflecting elasticity information acquired through the elasticity processing apparatus 103, or simultaneously displaying both the gray image and the elasticity image. In this embodiment, the emission and reception of the probe, the signal preprocessing apparatus, the B signal processing apparatus and the display apparatus can be realized by related techniques. Other processing apparatuses known to those skilled in the art can also be added, which will not be described in detail herein. Of course, the B signal processing apparatus can be omitted in the system of this embodiment. The elasticity processing apparatus 103 may comprise an elasticity information detecting module, a quality parameter calculating module and a frame processing module.

The elasticity information detecting module can be configured to extract elasticity information representing the elasticity of a target to be detected, which can be realized by a variety of conventional methods of extracting elasticity information. For example, a commonly used method for extracting elasticity information can be implemented based on cross-correlation between RF signals, which is achieved by rapidly detecting the displacement between two adjacent frames of RF signals with sum of absolute difference (SAD), and then calculating a gradient along longitudinal direction (i.e., the propagation direction of the ultrasonic wave) on the displacement field to acquire strain information. Other ways to detect displacement can be adopted, such as sum of squared difference (SSD), and so on. The elasticity information obtained by the elasticity information detecting module can finally be displayed, that is, the strain information may be outputted for obtaining an elasticity image, thereby achieving visually distinguishing tissues having different elasticity features.

The quality parameter calculating module can be configured for calculating at least a quality parameter reflecting the quality of each elasticity image (i.e. elasticity information). Here, the quality of each elasticity image can represent the reliability of each elasticity image, such that a reliable elasticity image can be outputted to a user through the display apparatus. The calculation of the quality parameter can be performed simultaneously when detecting the elasticity information. The quality parameter of the embodiment may include a parameter representing deformation degree or a deformation degree parameter for short and/or a parameter representing quality detected based on cross correlation or a cross correlation detecting quality parameter for short.

(1) Deformation Degree Parameter

For the elasticity information detecting module, with too small deformation of the tissue (e.g., <0.01%), the displacement may be too small (e.g., <4 um), affecting signal noise ratio (SNR) of the images; while with too large deformation of the tissue (e.g., >5%), the correlation between both signals obtained before and after the compression may be weakened, leading to increased inaccuracy of detecting the elasticity information. In addition, during acquiring image signals by the probe, the compression operation exerted on the tissue by the probe may be a continuous process. In a continuous compression operation on a tissue, the strain information of elasticity may be varied due to different deformations of the tissue, leading to great difference generated among adjacent multiple elasticity images and unstable images. Therefore, the deformation degree parameter may be regarded as one of the parameters used to evaluate each elasticity image in this embodiment.

For example, if the tissue deformation is less than 0.01%, the system can set a fixed minimum threshold parameter based on experimental or clinical experience and/or machine learning, which may mean that the deformation is too small (e.g., <0.01%) to obtain high-quality or high-contrast elastic images. An example fixed minimum threshold parameter is 0.01%. If the tissue deformation is higher than 5%, a fixed maximum threshold parameter can be set according to experimental or clinical experience and/or machine learning, which may mean that the deformation is too large. A fixed maximum threshold parameter may be 5%. At this time Hooke's law no longer holds, and it is not enough to obtain high-quality elastic images.

The deformation degree parameter may be an average strain value corresponding to the current elasticity image calculated in real time, that is, computing the average value of the strain data from a region of interest (ROI) of the current frame or from each sampling position within the whole scanning planar region, thus obtaining the average strain value Strain_mean. If the average strain value Strain_mean is within a range specified by the system (for example Strain_mean is less than a preset threshold based on experience and/or machine learning), it may represent that the deformation degree is proper.

In general, as in the case of a common frame rate (e.g., 10-30 Hz), the best average strain value range can be set to 0.01%-2%, or 0.05%-1% (the system can set the threshold in advance, or the user can adjust the position through the interface). At this time, on the one hand, a high drawing sensitivity can be maintained. The lower the average strain value, the lower the pressure of the probe will be to obtain the elastic image, which means increased sensitivity. At the same time, a relatively stable image contrast can be maintained. When the average strain value is large (e.g., 1%), the strain difference between soft and hard tissues is large (e.g., 2:1), and the contrast is good. However, when the strain value is too high (e.g., 5%), the tissue shape is large, and the elastic result is inaccurate. Thus, in some embodiments, the deformation degree parameter may be 0.02%-2%.

(2) Cross Correlation Detecting Quality Parameter

Since the elasticity information detecting module can detect the displacement based on the cross correlation between two adjacent frames of ultrasonic echo signals and acquire the longitudinal gradient based on the displacement to obtain the strain information, the accuracy of the displacement may play a role in the accuracy of the strain information, which eventually affects the contrast to noise ratio (CNR) and contrast of the elasticity image. With larger cross correlation between two frames of signals, the detected CNR may be higher (e.g., >3) and the detected result may be more accurate. If both frames of signals are almost uncorrelated to each other (e.g., a CC of 0.1), the detected result may be inaccurate. In this aspect, the cross correlation detecting quality parameter may be regarded as one of the parameters used to evaluate each elasticity image in this embodiment. The cross correlation detecting quality parameter may be a score of the current frame acquired by corresponding scoring rule selected by the method of displacement detection adopted in the elasticity information detecting module.

During detecting the displacement, for a signal at a sampling position in one frame of the ultrasonic echo signals, it may be needed to search the most correlated position within a search area of another frame of the ultrasonic echo signals. Taking employment of SAD to determine cross correlation as an example, the most correlated position can be the position corresponded to the least SAD value, and the difference between the position and corresponding original sampling position can be the displacement of the sampling position, which is similar to the techniques employed in conventional image matching methods, such as block matching algorithms. It can be appreciated that, when adopting SSD to determine the cross correlation, the most correlated position corresponds to the least SSD value and when adopting correlation coefficient (CC) to determine the cross correlation, the most correlated position corresponds to the greatest CC value.

For example, SAD refers to the sum of the absolute values of the difference between two sets of data, such as 0-200, or 0-300. SSD is the sum of squared differences between two sets of data, such as 0-40000, or 0-90000. CC refers to the correlation coefficient of the two sets of data, and the size is between −1 and 1. For example, 1 means that the two sets of data are exactly the same.

The cross correlation detection parameter is described here with example of using SAD to determine cross correlation. For every sampling position of each frame, the maximal SAD value SAD_max and the minimal SAD value SAD_min corresponding to every position within a search area may be recorded, and the quality score of the search area can be computed by:

I. presetting upper and lower limits of the distribution of SAD in the system, i.e., [SAD_Low, SAD_High], and SAD_Low<SAD_High; SAD_Low and SAD_High values can be predetermined by performing ultrasound elastography on a model tissue. For example, the user can compress the model tissue with too large (e.g., >2 N) or too small (e.g., 0.3 N) compression force to obtain the SAD_HIGH and SAD_LOW values, such as 15000 and 100, respectively. In some embodiments, the user can manually enter two values (e.g., 20000 and 0) before ultrasound elastography, and the ultrasound system may then calculate the score_SAD using the entered values as temporary SAD_HIGH and SAD_LOW values, examples of which may include 20000 and 0. When the user decides that the target in the elasticity image is clear enough to match his/her quality requirement, the entered values can be set as the SAD_HIGH and SAD_LOW values of the system. In this way, a specific range defined by the SAD_HIGH and SAD_LOW values can be determined. As an example, the lowest and highest values of sat may be 0 and 300, respectively, and is generally set by the system in advance based on experience and/or machine learning. According to Hooke's law, the larger the pressure, the larger the tissue deformation (larger strain), and the smaller the pressure, the smaller the tissue deformation (smaller strain). If the pressure is small, the deformation of the tissue is small (small strain). The strain may be small or too large, such as 0.01%-2% or 0.05%-1%.

II. calculating a first score score1 having a value within [0, 1] for evaluating the distance between the maximal SAD value of a position within current search area and the upper limit. The closer the distance, the higher the score. A first score, score1_ may be calculated according to the formula, score1=(SAD_max−SAD_min)/(SAD_High−SAD_min).

As an example, if SAD_max is 10000, SAD_Min is 100, and SAD_High is 20000, score1 maybe calculated to be 0.4975.

III. calculating a second score score2 having a value within [0, 1] for evaluating the distance between the minimal SAD value of a position within current search area and the lower limit. The closer the distance, the higher the score. A second score, score 2, may be calculated according to the formula, score2=(SAD_max−SAD_min)/(SAD_max−SAD_Low). As an example, if SAD_max is 10000, SAD_Min is 100, and SAD_Low is 0, score2 may be calculated to be 0.99.

IV. weighting score1 and score2, and taking the weighted result as the quality score score_SAD of current search. For example, score_SAD=score1*p+score2*(1−p), where p is a preset parameter ranged with 0.about.1 in the system. For example, the preset parameter p may be 0.5. The weighted result is a value within [0, 1]. Then, score_SAD may be multiplied by 100 to be extended to the range of [0, 100]. Of course, the quality score can also be immune from being such extension or being extended to other intervals, which can be determined based on a user's customs.

V. averaging the quality scores of all sampling positions of current frame, and obtaining the final quality score Score_mean of the frame. In general, the higher the score, the better the quality of the search will be. There can be a preset score threshold in the system, such as 60. If the score is higher than the threshold, the detected displacement of the frame may satisfy system requirements.

The aforesaid description refers to the method for detecting displacement based on SAD. With the foregoing description, those skilled in the art can appreciate that other methods for detecting displacement can be employed according to the actual to select corresponding scoring method for scoring the quality detected by cross correlation. The detailed computing steps about scoring mentioned above is for purpose of clear explanation that the object of the present disclosure is to score the cross correlation detection quality, not to limit the present disclosure. Further, the mentioned preset score threshold, the upper and lower limits of the distribution of SAD, the preset parameters and so on can be automatically set by the ultrasound system, or be directly set by a user through a user interface.

In one embodiment, any one of the deformation degree parameter and the cross correlation detecting quality parameter, or the combination thereof, can be adopted to determine whether the quality parameter of current frame meets the system requirement, that is, when the absolute value of the calculated Strain_mean is within a range specified by the system and the value of Score_mean is higher than a score threshold specified by the system, the quality parameter of the current frame may meet the system requirement.

After performing the elasticity information detecting module and the quality parameter calculating module, the elasticity information and the quality parameters of every consecutive frame may be sent to the frame processing module in real time for enhancing the stability among the frames. The frame processing module may be configured for determining whether to output the corresponding elasticity image based on the quality parameter of the elasticity information of each frame. In some embodiments, it is determined whether the quality parameter meets a preset quality requirement, where the preset quality requirement may refer to that a deformation degree parameter, e.g., an average strain value, is within a first acceptable range, and/or a cross correlation detecting quality parameter, e.g., a score value detained described below, is within a second acceptable range. The first acceptable range may be predefined by performing ultrasound elastography on a model. The second acceptable range may also be predefined by performing ultrasound elastography on a model. For example, the second acceptable range may be defined by SAD_HIGH and SAD_LOW. In some embodiments, the second acceptable range may be a value of [0, 1]. Example values for SAD_HIGH and SAD_LOW may be 10000 and 0, respectively.

The method for determining whether to output elasticity image in the frame processing module in the embodiment may comprise: if the quality parameter of the current frame to be processed fails to meet the preset quality requirement of the system, for example, the absolute value of the average strain value Strain_mean is outside a range specified by the system, or the score value Score_mean of the cross correlation detecting quality parameter is lower than a score threshold specified by the system, then the frame processing module may not output the elasticity image of current frame to the display apparatus, or may output the qualified elasticity image of previous frame as the elasticity image of current frame to the display apparatus. An example preset quality requirement may be 70.

The quality parameters are obtained according to the average strain size or/and the correlation score, for example: the quality score can be set to 0-100 points, >=60 points means qualified quality, <60 points means unqualified (whether qualified score threshold It is also preset by the system based on experience, such as setting it to 60 or setting it to 80). For another example, the quality score can be set to 0-1 points, >=0.6 points means qualified quality, <0.6 points means unqualified (the threshold for qualified scores is also preset by the system based on experience, for example, set to 0.6 or set to 0.8).

The condition where the elasticity image of current frame is not outputted implies that it may be needed to recollect image(s) due to a user's improper operation. The condition where the elasticity image of previous frame is displayed as the elasticity image of current frame may mean that all the displayed images may have qualities that meet a preset requirement, thereby avoiding the situation that colors of the acquired successive elasticity image vary due to large difference existing in the stress, and finally improving the stability of the elasticity images, which may simplify the recognition or judgment of elasticity image in clinical practice.

One embodiment of the method for ultrasound elastography in the present disclosure corresponds to the aforesaid embodiment of the system for ultrasound elastography. The method may comprise:

a transmitting and receiving step 11 for emitting an ultrasonic beam and receiving ultrasonic echo signals by a probe based on a predefined scanning rule under elasticity imaging mode;

a signal preprocessing step 12 for preprocessing the received ultrasonic echo signals, the signal preprocessing including beam forming process;

an elasticity processing step 13 for extracting elasticity information reflecting the target to be detected, computing the quality parameter reflecting the quality of each elasticity image corresponding to the elasticity information, and according to the quality parameter of each elasticity image, determining whether to output the corresponding elasticity image;

a display step 14 for displaying the outputted image.

The above steps can be implemented with reference to the corresponding modules described in the aforesaid embodiment of the system for ultrasound elastography, which will not be repeated herein. Further, the abovementioned method embodiment can also comprise a step of processing B signal for generating a gray image of the target to be detected.

Second Embodiment

Figure 2A:
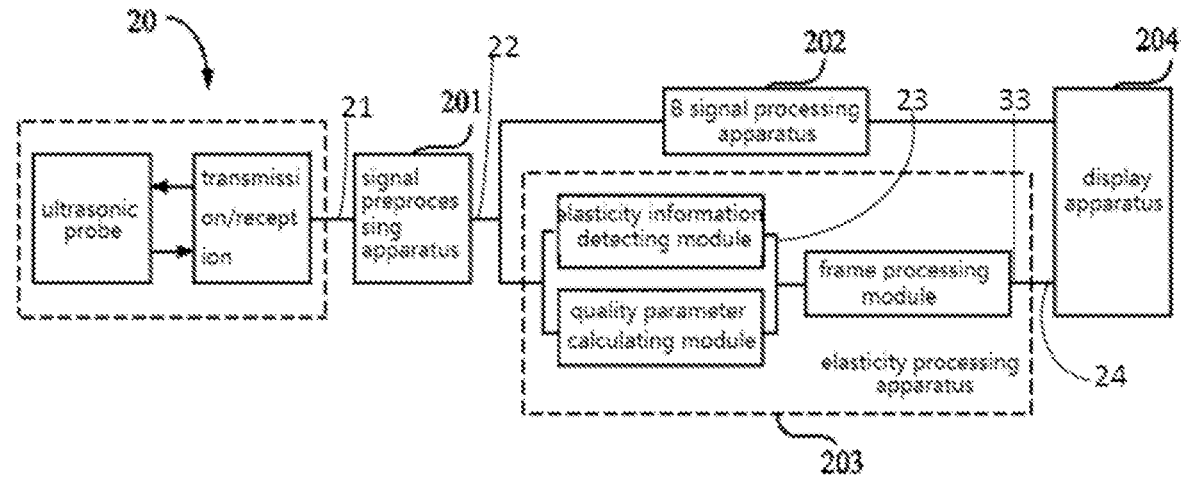
FIGS. 2A and 2B are schematic block diagrams of a system for ultrasound elastography.

A system 20 for ultrasound elastography of this embodiment schematically shown in FIG. 2A may comprise: an ultrasonic probe, a signal preprocessing apparatus 201, a B signal processing apparatus 202, an elasticity processing apparatus 203 and a display apparatus 204.

The ultrasonic probe, the signal preprocessing apparatus 201, the B signal processing apparatus 202 and the display apparatus 204 may be similar to the ultrasonic probe, the signal preprocessing apparatus 101, the B signal processing apparatus 102 and the display apparatus 104 in the first embodiment respectively, which will not be repeated herein. The elasticity processing apparatus 203 still may comprise an elasticity information detecting module, a quality parameter calculating module and a frame processing module. The elasticity information detecting module and the quality parameter calculating module may be similar to the elasticity information detecting module and the quality parameter calculating module in the first embodiment respectively, which will also not to be described herein. The frame processing module of the elasticity processing apparatus 203 in the embodiment may also be configured for according to the quality parameter of each elasticity image, determining whether to output the elasticity image of corresponding frame, however, the way to determine whether to output the elasticity image is different from that in the first embodiment.

Figure 2B:
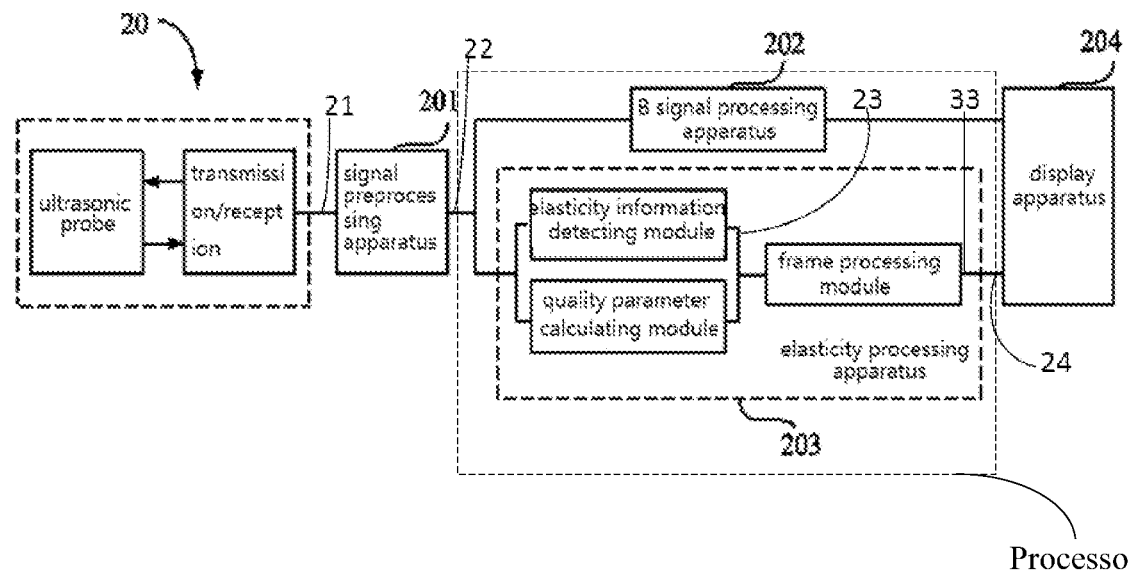
Figure 4:
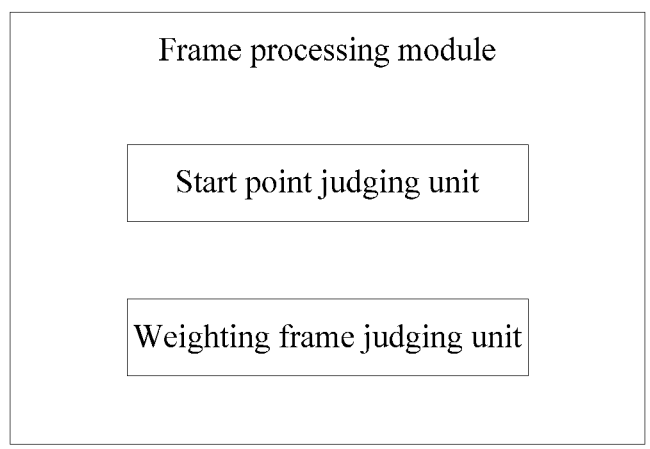
FIG. 4 is a schematic block diagram for a frame processing module.

In this embodiment, the way to determine whether to output the elasticity image in the frame processing module may refer to several key steps, that is, the frame processing module may comprise a start point judging unit for determining a dynamic process start point in real time, a weighting frame judging unit for judging whether to weight frames. The start point judging unit, as all of the units described herein, may be implemented using a suitable combination of hardware, software, or firmware. For example, the various units may be implemented as program code stored in a non-transitory computer-medium. The program code, when executed by a processor, as shown in FIG. 2B, may cause the processor to perform the desired operations. Thus, various "methods" described herein may be understood as algorithms executed within an imaging system. The frame processing module, including the start point judging unit and the weighting frame judging unit, is illustrated in FIG. 4. Each of the aforementioned modules and units may be implemented using any suitable combination of hardware, software, or firmware.

Furthermore, the result of dynamic inter frames process of previous frame, which is outputted for display, may need to be stored to assist the process of the current frame. Specifically, for the current frame passed into the frame processing module, if there is no dynamic process start point currently, it may be needed to search the dynamic process start point firstly. The method for judging dynamic process start point in real time needed to be performed now may comprise:

a) if the quality parameter of current frame fails to meet a predefined system requirement (e.g., 50), the data of the current frame may not be outputted, that is, the elasticity image of the current frame may not be outputted;

b) if the quality parameter of current frame meets the predefined system requirement, that is, the absolute value of the calculated Strain_mean may be within a range (e.g., 0.3% to 3%) specified by the system and at the same time the score of the cross correlation detecting quality parameter i.e. Score_mean is higher than a score threshold specified by the system (e.g., higher than 50), then the data of current frame may be outputted, and the current frame may be regarded as the dynamic process start point known as a start point frame. Each frame behind the current frame may need to be judged whether to be weighted.

The aforesaid judging the dynamic process start point may be performed when the system needs to search the start point (i.e. no searching start point or the original searching start point has been invalided), while the judgment on frame weighting may be performed after the system has found the dynamic process start point frame.

The method for determining whether to weight frames may be as follows:

A) if the quality parameter of current frame meets a preset system requirement (e.g., 50), weighting the current frame and the result of the previous frame (i.e. previous image), outputting the weighted result and displaying the same. Weighting coefficients can be used to weight the current frame and the result of the previous frame, where the weighting coefficient of each frame of the current frame and the result of the previous frame may represent a percentage of each frame in the weighted result. In some embodiments, the weighting coefficients of both frames can be a value within [0, 1], such as, for example, 0.5 In some embodiments, the weighting coefficients of both frames can be specified by the system. In some embodiments, the system may provide several predefined weighting coefficients (such, as, for example, 0.1, 0.3, 0.5, 0.7, 0.9), so that a user can select from the several predefined weighting coefficients according to a desired image requirement. In a weighting method, provided that the result of previous frame is R(i−1), the data of current frame is D(i), where i represents the current frame number, k is the weighting coefficient specified by the system, then the result of weighted frames is:

$$R(i)=R(i-1)*k+D(i)*(1-k),$$

where, the more the weighting coefficient k is close to a value of 1, the result of weighted frame R(i) can be more stable. An example weighting coefficient k calculated according to the formula above is 0.7.

B) if the quality parameter of current frame fails to meet the preset system requirement, outputting the result of previous frame as the data of current frame to the display apparatus, simultaneously invalidating the original dynamic process start point, and clearing the number of consecutive bad frames.

Figure 3:
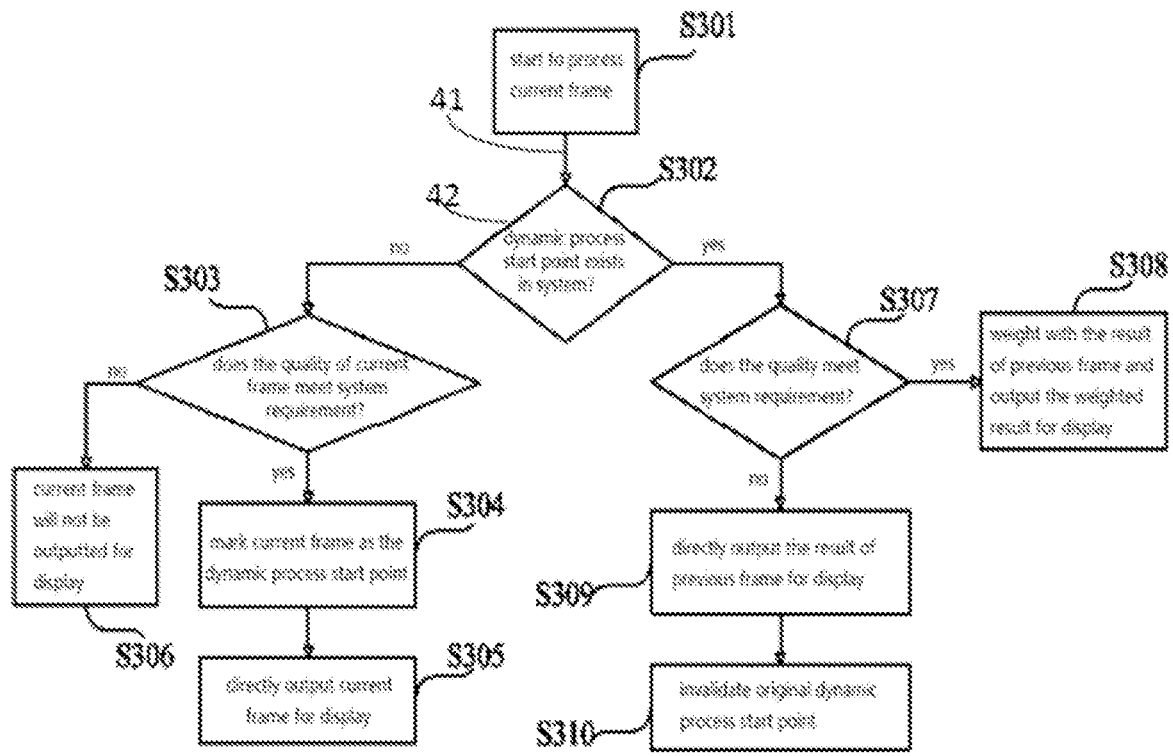
FIG. 3 is a schematic flow chart related to frame processing module of the embodiment illustrated in FIGS. 2A and 2B.

The specific process/algorithm involved in the frame processing module shown in FIG. 3 may comprise:

a step S301, starting to process the inputted current frame, a step S302, judging whether the system exists a dynamic process start point, if yes, turning to perform step S307, if no, turning to perform step S303, a step S303, judging whether the quality parameter of current frame meets a quality requirement preset by the system, if yes, turning to perform step S304, if no, turning to perform step S306, a step S304, marking the current frame as the dynamic process start point, and proceeding to perform step S305, a step S305, directly outputting the data of current frame, a step S306, not outputting the data of current frame. It can be understood that the step S301 may be repeated to be performed after the step S306, that is, performing a new round of judgment on a new received and inputted frame.

a step S307, judging whether the quality parameter of current frame meets the system requirement, if yes, turning to perform step S308, if no, turning to perform step S309, a step S308, weighting the current processing frame and the result of previous frame, and outputting the weighted result. It can be understood that, the step S301 may be repeated after the step S308, that is, performing a new round of judgment on a new received and inputted frame.

a step S309, directly outputting the result of previous frame, and proceeding to perform step S310, a step S310, invalidating the original dynamic process start point (that is at the next round of judgment, the current dynamic process start point may not be existed). It can be understood that, the step S301 may be repeated after the step S310, that is, performing a new round of judgment on a new received and inputted frame.

Those skilled in the art can change the sequence of above steps without affecting the design of the above procedure, for example, the execution sequence of the step S309 and the step S310 can be reversed, or the step S309 and step S310 can be performed simultaneously at a specific implementation. Under the condition that there is no dynamic process start point in the system, nor the quality parameter of current frame satisfying system requirement, the elasticity image may not be displayed in the system, so as to inform a user to recollect image by adjusting his/her operation.

The frame process module of the embodiment is actually configured for searching a dynamic process start point, after finding the start point, based on the quality of the frame, selectively to perform whether to weight with the result of previous frame for outputting the weighted result or to directly output the result of previous frame, thus ensuring the quality of outputted image. If the image is originated from strain data having similar deformation degrees and accurate and reliable search result, the stability of the outputted image may be enhanced, thus simplifying the recognition or judgment of the elasticity image in clinical practice.

One embodiment of the method for ultrasound elastography in the present disclosure is similar to the aforesaid second embodiment of the system for ultrasound elastography. The method may comprise:

a step 21 for emitting an ultrasonic beam and receiving ultrasonic echo signals by a probe based on a predefined scanning rule under elasticity imaging mode;

a step 22 for processing the received ultrasonic echo signals, the signal preprocessing including beam forming process;

a step 23 for extracting the elasticity information reflecting the target to be detected, computing the quality parameter reflecting the quality of each elasticity image corresponding to the elasticity information, and according to the quality parameter of each elasticity image, determining whether to output the corresponding elasticity image, wherein when determining whether to output the elasticity image, several substeps may be adopted such as judging dynamic process start point in real time and judging whether to weight frames;

a step 24 for displaying the outputted image.

The above steps can be implemented with reference to the corresponding modules described in the aforesaid embodiment of the system for ultrasound elastography, which will not be repeated herein. Further, the abovementioned method embodiment can also comprise a step of processing B signal for generating a gray image of the target to be detected.

Third Embodiment

Figure 5A:
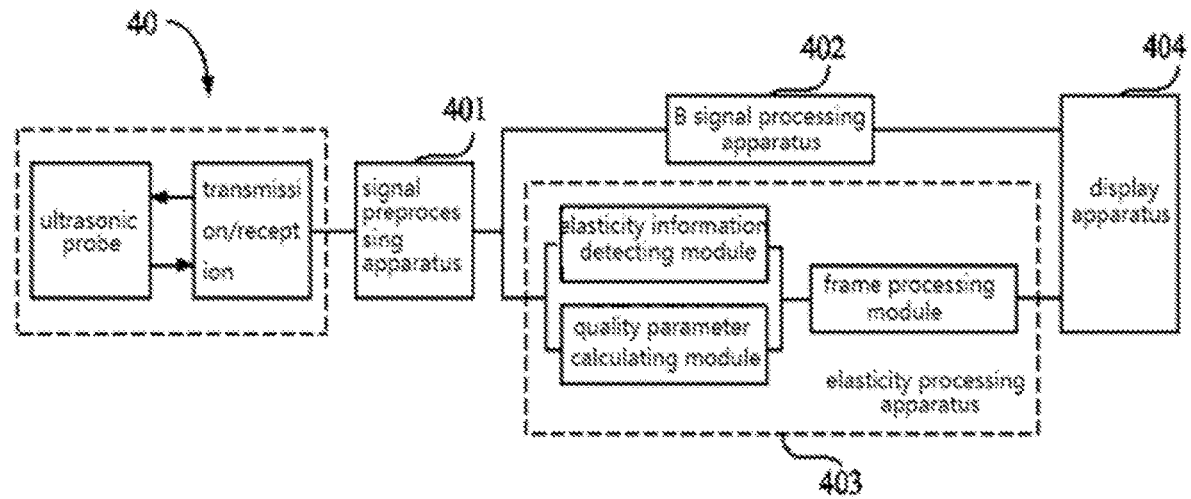
FIGS. 5A and 5B are schematic block diagrams of a system for ultrasound elastography.

A system 40 for ultrasound elastography of this embodiment schematically shown in FIG. 5A may comprise: an ultrasonic probe, a signal preprocessing apparatus 401, a B signal processing apparatus 402, an elasticity processing apparatus 403 and a display apparatus 404.

Figure 7:
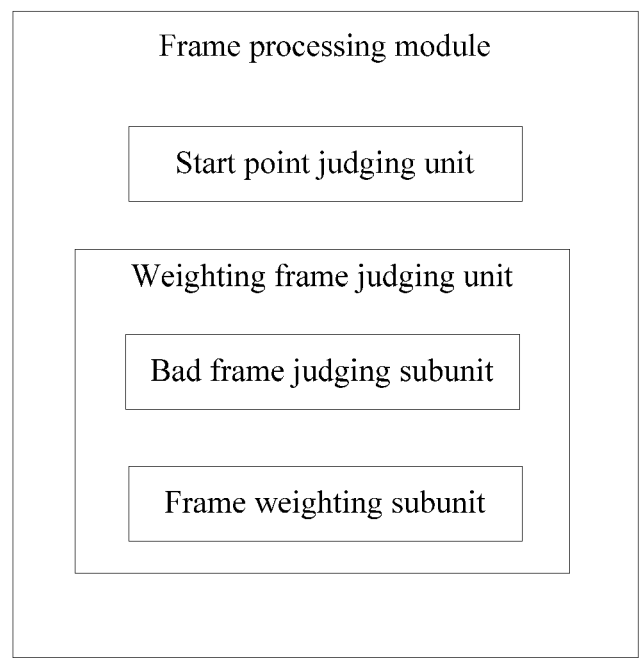
FIG. 7 is another schematic block diagram for a frame processing module.

The ultrasonic probe, the signal preprocessing apparatus 401, the B signal processing apparatus 402 and the display apparatus 404 may be similar to the ultrasonic probe, the signal preprocessing apparatus 101, the B signal processing apparatus 102 and the display apparatus 104 in the first embodiment respectively, which will not be repeated herein. The elasticity processing apparatus 403 still may comprise an elasticity information detecting module, a quality parameter calculating module and a frame processing module. The elasticity information detecting module and the quality parameter calculating module are similar to the elasticity information detecting module and the quality parameter calculating module in the second embodiment respectively, which will also not to be described herein. The frame processing module of the elasticity processing apparatus 403 in the embodiment can also be configured for according to the quality parameter of each elasticity image, determining whether to output the elasticity image of corresponding frame; however, unlike the second embodiment, the frame weighted judging unit here further may comprise a bad frame judging subunit for judging the number of consecutive bad frames and a frame weighting subunit for performing weighting. The method for real-time judging a dynamic process start point in the start point judging unit of the frame processing module is similar to that in the second embodiment, which will not be repeated herein. Similarly, the judgment of dynamic process start point mentioned above can be performed when the system needs to search the start point (i.e. no searching start point or the original searching start point has been invalidated), while the judgment on frame weighting may be performed after the system has found the dynamic process start point frame. It can be understood that the result of the dynamic inter frames process of previous frame which is outputted for display needs to be stored to assist the process of the current frame. FIG. 7 illustrates the frame processing module including the start point judging unit and the weighting frame judging unit. The weighting frame judging unit includes the bad frame judging subunit and the frame weighting subunit. The foregoing units and modules may be implemented using any suitable combination of hardware, software, or firmware.

Once the dynamic process start point is found out, from the start point frame, the number of consecutive bad frames failed to meet the system requirement may be needed to be accumulated to assist the process of subsequent frames. Here, the term "the number of consecutive bad frames" may refer to the number of consecutive frames with quality that fails to satisfy a preset quality requirement. Once a frame with quality satisfying the system requirement comes up, the number of consecutive bad frames may be cleared, followed with performing frame weighting. The number of consecutive bad frames may be re-accumulated when a frame with quality that fails to satisfy the system requirement comes up.

The method for determining whether to weight frames may be as follows:

A) if the quality parameter of current frame meets a preset system requirement, weighting the current frame and the result of the previous frame, outputting the weighted result and displaying the same. Weighting coefficients can be used to weight the current frame and the result of the previous frame, where the weighting coefficient of each frame of the current frame and the result of the previous frame may represent a percentage of each frame in the weighted result. In some embodiments, the weighting coefficients of both frames can be a value within [0, 1]. For example, the weighting coefficient may be 0.5. In some embodiments, the weighting coefficients of both frames can be specified by the system. In some embodiments, the system may provide several predefined weighting coefficients, so that a user can select from the several predefined weighting coefficients according to a desired image requirement. In a weighting method, provided that the result of previous frame is R(i−1), the data of current frame is D(i), where i represents the current frame number, k is the weighting coefficient specified by the system, then the result of weighted frames may be computed by:

$$R(i)=R(i-1)*k+D(i)*(1-k),$$

where, the more the weighting coefficient k is close to a value of 1, the result of weighted frame R(i) can be more stable.

B) if the quality parameter of current frame fails to meet the preset system requirement, it may be involved with determining the number of consecutive bad frames. There are two situations: (1) if the accumulated number of consecutive bad frames is less than a preset threshold (the preset threshold is set based on experience and/or machine learning in an example), outputting the result of previous frame as the data of current frame; (2) if the accumulated number of consecutive bad frames is greater than the preset threshold, the system may not output the data of current frame, instead, it may invalidate the original dynamic process start point, search a dynamic process start point from the subsequent frames, and clear the number of consecutive bad frames; thus the above process is carried out in a dynamic cycle.

Figure 5B:
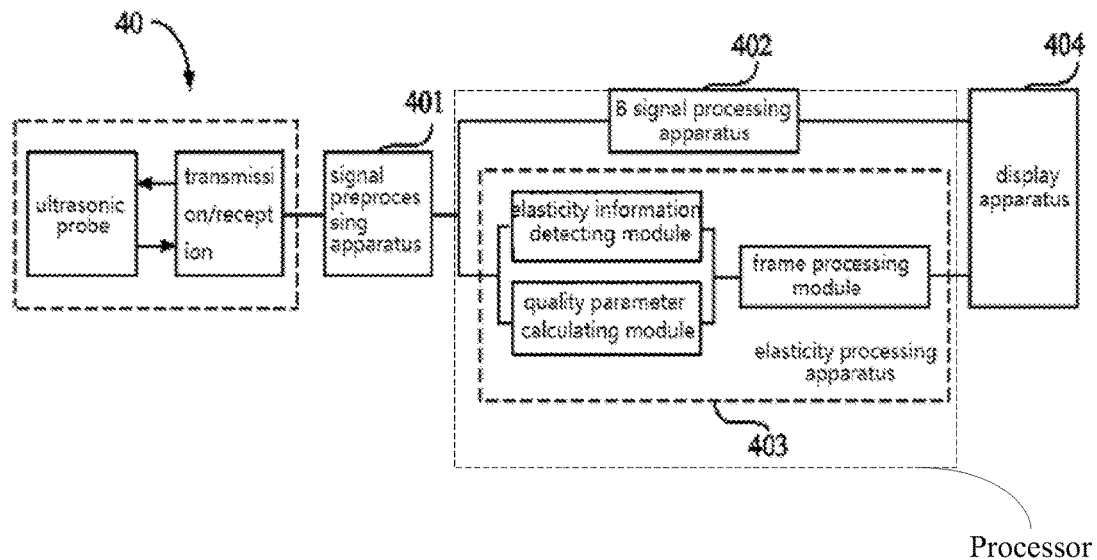

As shown in FIG. 5B, the B signal processing apparatus, the elasticity information detecting module, the quality parameter calculating module, and the frame processing module may be implemented by a processor using any suitable combination of hardware, software, and firmware.

Figure 6:
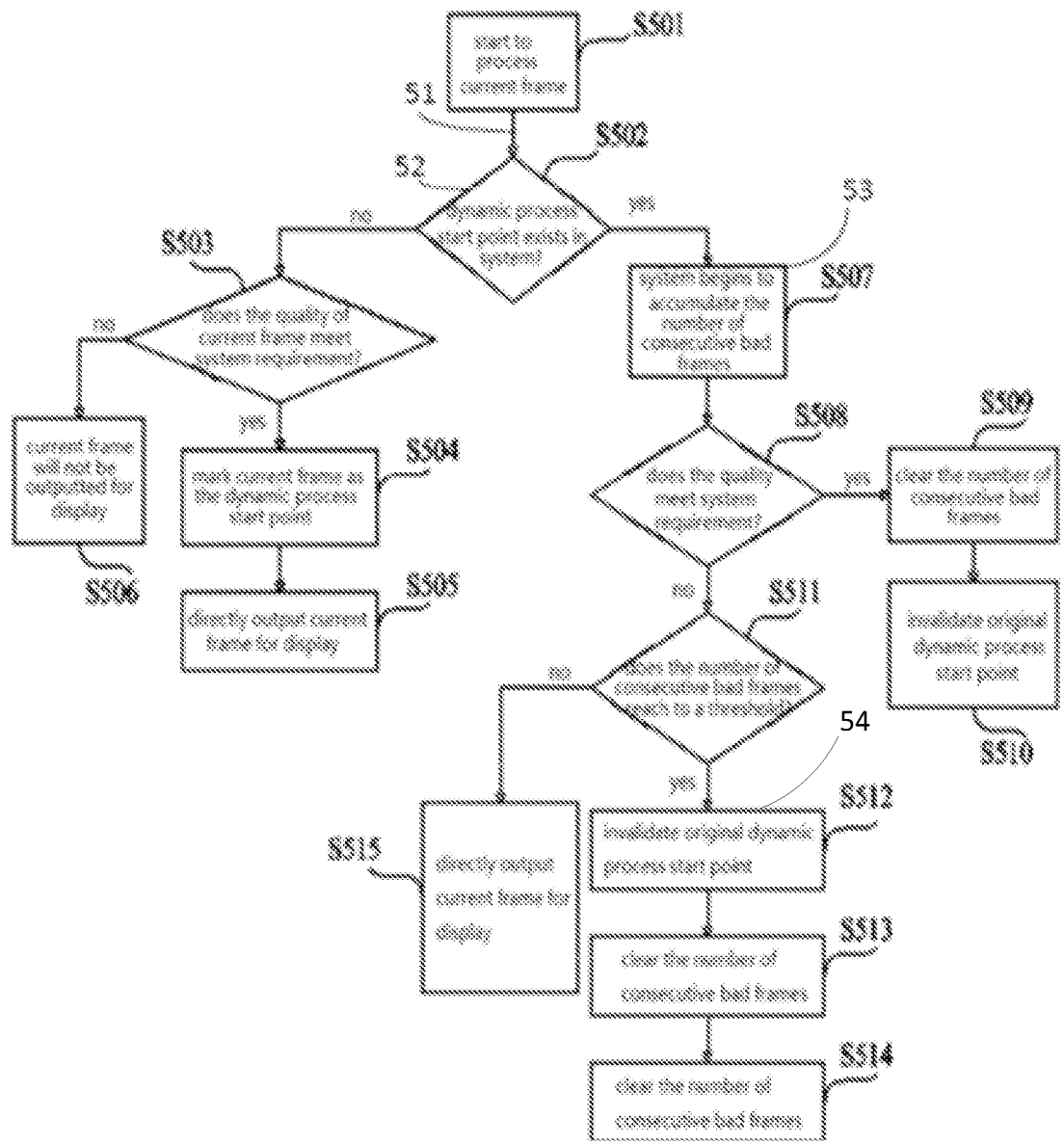
FIG. 6 is a schematic flow chart related to frame processing module of the embodiment illustrated in FIGS. 5A and 5B.

The specific process/algorithm involved in the frame processing module shown in FIG. 6 may comprise:

a step S501, starting to process the inputted current frame, a step S502, judging whether the system exists a dynamic process start point, if yes, turning to perform step S507, if no, turning to perform step S503, a step S503, judging whether the quality parameter of current frame meets a quality requirement preset by the system, if yes, turning to perform step S504, if no, turning to perform step S506, a step S504, marking the current frame as the dynamic process start point, and proceeding to perform step S505, a step S505, directly outputting the data of current frame, a step S506, not outputting the data of current frame. It can be understood that the step S501 may be repeated after the step S506, that is, performing a new round of judgment on a new received and inputted frame.

a step S507, beginning to accumulate the number of consecutive bad frames, and proceeding step S508, a step S508, judging whether the quality parameter of current frame meets the system requirement, if yes, turning to perform step S509, if no, turning to perform step S511, a step S509, clearing the number of consecutive bad frames, and proceeding step S510, a step S510, weighting the current processing frame and the result of previous frame, and outputting the weighted result. It can be understood that, the step S501 may be repeated after the step S510, that is, performing a new round of judgment on a new received and inputted frame.

a step S511, judging whether the number of consecutive bad frames reaches a preset threshold, if yes, turning to perform step S512, if no, turning to perform step S515 to directly output the result of previous frame, a step S512, invalidating the original dynamic process start point (that is at the next round of judgment, the current dynamic process start point does not exist), and proceeding to step S513, a step S513, clearing the number of consecutive bad frames, a step S514, not outputting the data of current frame. It can be understood that the step S501 may be repeated after the step S514, that is, performing a new round of judgment on a new received and inputted frame.

Those skilled in the art can change the sequence of above steps without affecting the design of the above procedure, for example, the execution sequence of the step S309 and the step S310 can be reversed, or the step S309 and step S310 can be performed simultaneously at a specific implementation. Under the condition that there is no dynamic process start point in the system, nor the quality parameter of current frame satisfying system requirement, the elasticity image may not be displayed in the system, so as to inform a user to recollect image by adjusting his/her operation.

One embodiment of the method for ultrasound elastography in the present disclosure is similar to the aforesaid third embodiment of the system for ultrasound elastography. The method/algorithm may comprise:

a step 31 for emitting an ultrasonic beam and receiving ultrasonic echo signals by a probe based on a predefined scanning rule under elasticity imaging mode;

a step 32 for processing the received ultrasonic echo signals, the signal preprocessing including beam forming process;

a step 33 for extracting the elasticity information reflecting the target to be detected, computing the quality parameter reflecting the quality of each elasticity image corresponding to the elasticity information, and according to the quality parameter of each elasticity image, determining whether to output the corresponding elasticity image, wherein when determining whether to output the elasticity image, several substeps may be adopted such as judging dynamic process start point in real time, judging whether to weight frames and determining the number of consecutive bad frames;

a step 34 for displaying the outputted image.

The above steps can be implemented with reference to the corresponding modules described in the aforesaid embodiment of the system for ultrasound elastography, which will not be repeated herein. Further, the abovementioned method embodiment can also comprise a step of processing B signal for generating a gray image of the target to be detected.

In this embodiment, under the elasticity imaging mode, by means of emitting an ultrasonic beam and receiving ultrasonic echo signals by a probe according to a predefined scanning rule, outputting RF signal through beamforming, extracting elasticity information through the elasticity information detecting module, calculating parameters reflecting quality of elasticity information of each frame through the quality parameter calculating module, carrying out a further process in the frame processing module, and outputting final elasticity image, the stability among the frames can be enhance. The frame processing module may be actually used for searching the dynamic process start point, after finding out the start point, based on the quality of the frame, selectively performing whether to weight the current frame and the result of previous frame or directly output the result of previous frame. Once consecutive bad frames occur, a new start point may be search again. This may be a real-time dynamic cycle, which finally ensures the quality of outputted image of the system. If the image is originated from strain data having similar deformation degrees and accurate and reliable search result, the stability of the outputted image can be enhanced, thus simplifying the recognition or judgment of the elasticity image in clinical practice.

Fourth Embodiment

The method for dynamically process frames in real time in ultrasound imaging in the embodiment may comprise:

a step 41 for calculating the quality parameter reflecting the quality of each image;

a step 42 for judging whether there exists a dynamic process start point frame in the ultrasound imaging system, the dynamic process start point frame being defined as a frame with quality parameter that meets preset quality requirement, when no dynamic process start point frame existed, judging whether the quality parameter of the current frame meets the preset quality requirement, if no, the current image being not outputted, if yes, the current image being outputted and regarded as the dynamic process start point frame.

a step 43 for when the dynamic process start point frame is existed via the step 42, judging whether the quality parameter of the current image meets the preset quality requirement, if no, outputting the result of previous frame as the data of current frame, simultaneously, invalidating the original dynamic process start point, if yes, weighting the current frame and the result of previous frame and outputting the weighted result.

The detailed process/algorithm of the steps 42 and 43 can refer to the flow chart illustrated in FIG. 3, which will not be repeated herein. It can be understood that the system needs to store the dynamic process result of the previous frame for assisting the output and display of current frame. For the ultrasound imaging under the elasticity imaging mode, the involved quality parameter can be the deformation degree parameter and the cross correlation detecting quality parameter mentioned in the second embodiment, and the preset quality parameter may be related to those parameters; while for the ultrasound imaging under non-elasticity image mode, the quality parameter involved in the step 41 can be other parameters for evaluating the image quality, such as SNR and contrast of the image. Of course, the preset quality parameter may be related to the adopted parameters.

The frame processing module of the embodiment may be actually configured for searching dynamic process start point, after finding the start point, based on the quality of the frame, selectively performing whether to weight the current frame and the result of previous frame or directly output the result of previous frame, thus ensuring the quality of outputted images of the system, and enhancing the stability of outputted images of the system.

Fifth Embodiment

The method/algorithm for dynamically processing frames in real time in ultrasound imaging in the embodiment may comprise:

a step 51 for calculating the quality parameter reflecting the quality of each image;

a step 52 for judging whether there exists a dynamic process start point frame in the ultrasound imaging system, the dynamic process start point frame being defined as a frame with quality parameter that meets preset quality requirement, when no dynamic process start point frame existed, judging whether the quality parameter of the current frame meets the preset quality requirement, if no, the current image being not outputted, if yes, the current image being outputted and regarded as the dynamic process start point frame.

a step 53 for when the dynamic process start point frame is existed via the step 52, beginning to accumulate the number of consecutive bad frames. The number of consecutive bad frames may refer to the number of consecutive frames with quality that fails to satisfy a preset quality requirement. Once a frame with quality satisfying the system's requirement comes up, the number of consecutive bad frames may be cleared, followed with performing frame weighting, i.e. weighting the current frame and the result of previous frame and outputting the weighted result. The number of consecutive bad frames can be re-accumulated when a frame with quality that fails to satisfy the system requirement comes up.

a step 54 for under the situation that the quality parameter of current frame fails to meet the system requirement, and the number of consecutive bad frames reaches to a preset threshold (usually set based on experience), invalidating the original dynamic process start point, clearing the number of consecutive bad frames, followed with no data of current frame being outputted; while under the situation that the quality parameter of current frame fails to meet the system requirement, and the number of consecutive bad frames does not reach to a preset threshold (usually set based on experience), outputting the result of previous frame as the data of current frame.

The detailed process/algorithm of the steps 52-54 can be found in the flow chart illustrated in FIG. 6, which will not be repeated herein. It can be understood that the system needs to store the dynamic process result of the previous frame for assisting the output and display of current frame. For the ultrasound imaging under the elasticity imaging mode, the involved quality parameter can be the deformation degree parameter and the cross correlation detecting quality parameter mentioned in the second embodiment, and the preset quality parameter can be related to those parameters; while for the ultrasound imaging under non-elasticity image mode, the quality parameter involved in the step 51 can be other parameters for evaluating the image quality, such as SNR and contrast of the image. Of course, the preset quality parameter can be related to the adopted parameters.

The method for dynamically processing frames in real time in ultrasound imaging in the embodiment may be actually configured for searching dynamic process start point, after finding the start point, based on the quality of the frame, selectively performing whether to weight the current frame and the result of previous frame or directly output the result of previous frame. Once consecutive bad frames occur, a new start point may be searched again. This may be a real-time dynamic cycle, which finally ensures the quality of outputted image of the system and the relevance among consecutive images. If the image is originated from strain data having similar deformation degrees and accurate and reliable search result, the stability of the outputted image can be enhanced, thus simplifying the recognition or judgment of the elasticity image in clinical practice.

In summary, according to the method or system provided in the abovementioned embodiments, the output and display of consecutive frames can be determined dynamically with controlling of output thereof in real time, the qualified frames performed with being weighted may increase the correlation among adjacent frames, with selectively deleting bad frames at the same time. When a large amount of bad frames appears, the user may be informed to recollect images due to improper operation, thus greatly increasing the stability of the elasticity image and simplifying the recognition or judgment of the elasticity image in clinical practice.

Those skilled in the art can appreciate that, all and part of the steps of methods in the aforesaid embodiments can be achieved by instructing related hardware through a program, where the program can be stored in a computer-readable storage medium which may include read-only memory, random access memory, disk or CD-ROM.

Though the present disclosure has been described in detailed by way of specified examples, the examples are used for helping to appreciate the present disclosure, not to limit the present disclosure. Those skilled in the art can change the above specified embodiments based on the spirit of the present disclosure.

This disclosure has been made with reference to various exemplary embodiments including the best mode. However, those skilled in the art will recognize that changes and modifications may be made to the exemplary embodiments without departing from the scope of the present disclosure. For example, various operational steps, as well as components for carrying out operational steps, may be implemented in alternate ways depending upon the particular application or in consideration of any number of cost functions associated with the operation of the system, e.g., one or more of the steps may be deleted, modified, or combined with other steps.

Additionally, as will be appreciated by one of ordinary skill in the art, principles of the present disclosure may be reflected in a computer program product on a computer-readable storage medium having computer-readable program code means embodied in the storage medium. Any tangible, non-transitory computer-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a computer-readable memory that can direct a computer or other programmable data processing apparatus to function in a particular manner, such that the instructions stored in the computer-readable memory produce an article of manufacture, including implementing means that implement the function specified. The computer program instructions may also be loaded onto a computer or other programmable data processing apparatus to cause a series of operational steps to be performed on the computer or other programmable apparatus to produce a computer-implemented process, such that the instructions that execute on the computer or other programmable apparatus provide steps for implementing the functions specified.

While the principles of this disclosure have been shown in various embodiments, many modifications of structure, arrangements, proportions, elements, materials, and components, which are particularly adapted for a specific environment and operating requirements, may be used without departing from the principles and scope of this disclosure. These and other changes or modifications are intended to be included within the scope of the present disclosure.

The foregoing specification has been described with reference to various embodiments. However, one of ordinary skill in the art will appreciate that various modifications and changes can be made without departing from the scope of the present disclosure. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Those having skill in the art will appreciate that many changes may be made to the details of the above-described embodiments without departing from the underlying principles of the invention. The scope of the present invention should, therefore, be determined only by the following claims.

What is claimed is:

1. A system for ultrasound elastography, comprising:
   an ultrasonic probe that emits an ultrasonic beam to a target to be detected and receives ultrasonic echoes from the target to obtain received signals;
   a processor that performs an elasticity process on the received signals from the ultrasonic probe to obtain a plurality of elasticity images; and
   a display device that displays one or more of the plurality of elasticity images;
   wherein the processor is configured to:
      extract elasticity information representing an elasticity of the target from the plurality of elasticity images corresponding to the received signals from the ultrasonic probe;
      calculate at least a quality parameter reflecting quality of each elasticity image of the plurality of elasticity images corresponding to the elasticity information;
      identify whether a dynamic process start point frame exists in a sequence of corresponding frames of the plurality of elasticity images, wherein the dynamic process start point frame is a frame with the quality parameter that meets a preset quality requirement; and
      in response to determining that the dynamic process start point frame exists in the sequence of corresponding frames of the plurality of elasticity images:
         obtain a current frame, wherein the current frame is any frame behind the dynamic process start point frame;
         determine whether the quality parameter of the current frame meets the preset quality requirement; and
         when the quality parameter of the current frame meets the preset quality requirement, weight the current frame and a previous frame and output a weighted result,
   wherein the display device is further configured to display the corresponding weighted result, that is determined to be outputted by the processor.

2. The system for ultrasound elastography according to claim 1, wherein, if no dynamic process start point frame exists, the processor is further configured to:
   determine whether the quality parameter of the current frame meets the preset quality requirement;

refrain from outputting the current frame if the quality parameter of the current frame fails to meet the preset quality requirement; and output the current frame as a corresponding elasticity image if the quality parameter of the current frame meets the preset quality requirement, and wherein the current frame is regarded as the dynamic process start point frame if the quality parameter of the current frame meets the preset quality requirement.

3. The system for ultrasound elastography according to claim 1, wherein the processor is further configured to:

after determining the existence of the dynamic process start point frame, accumulate a number of consecutive bad frames, the number of consecutive bad frames being defined as the number of consecutive frames with quality that fails to satisfy the preset quality requirement, under the situation that the quality parameter of the current frame does not meet the preset quality requirement, determine whether the number of consecutive bad frames reaches a preset threshold, if the number of consecutive bad frames reaches the preset threshold, invalidate the dynamic process start point frame and clear the number of consecutive bad frames, followed with the current frame being not outputted; if the number of consecutive bad frames does not reach the preset threshold, output the previous frame; and after determining that the quality parameter of the current frame meets the preset quality requirement, clear the number of consecutive bad frames, weight the current frame and the previous frame, and output the weighted result.

4. The system for ultrasound elastography according to claim 1, wherein the quality parameter comprises at least one of a deformation degree parameter and a cross correlation detecting quality parameter; the deformation degree parameter is an average strain value corresponding to the current frame; the cross correlation detecting quality parameter is a score of the current frame acquired by a corresponding scoring rule selected by a method of displacement detection adopted in the processor.

5. The system for ultrasound elastography according to claim 4, wherein the method of displacement detection adopted in the processor refers to a sum of absolute difference (SAD), the score is computed by:

calculating a first score, wherein the first score is configured for evaluating a distance between a maximal SAD value of a position within a current search area and an upper limit of a distribution of SAD values;

calculating a second score, wherein the second score is configured for evaluating a distance between a minimal SAD value of a position within the current search area and a lower limit of the distribution of the SAD values;

weighting the first score and the second score, and taking a weighted score as a quality score of current search; and averaging quality scores of all sampling positions of the current frame, and obtaining a final quality score of the current frame.

6. The system for ultrasound elastography according to claim 5, wherein the first score is calculated as:

$$score1=(SAD\_max-SAD\_min)/(SAD\_High-SAD\_min),$$

the second score is calculated as:

$$score2=(SAD\_max-SAD\_min)/(SAD\_max-SAD\_Low),$$

the first score and the second score are weighted as:

$$score\_SAD=score1*p+score2*(1-p),$$

wherein score1 is the first score, score2 is the second score, SAD_max is the maximal SAD value of the current search area, SAD_min is the minimal SAD value of the current search area, SAD_High is the upper limit of the distribution of the SAD values preset by the system, SAD_Low is the lower limit of the distribution of the SAD values preset by the system, score_SAD is the quality score of the current search, p is a weighting coefficient preset by the system.

7. The system for ultrasound elastography according to claim 1, wherein the processor is further configured to:

in response to determining that the dynamic process start point frame exists in the sequence of corresponding frames of the plurality of elasticity images, output the previous frame when the quality parameter the current frame does not meet the preset quality requirement.

8. A system for ultrasound elastography, comprising:

an ultrasonic probe that emits an ultrasonic beam to a target to be detected and receives ultrasonic echoes from the target to obtain received signals;

a processor that performs an elasticity process on the received signals from the ultrasonic probe to obtain a plurality of elasticity images; and a display device that displays one or more of the plurality of elasticity images;

wherein the processor is configured to:

extract elasticity information representing an elasticity of the target from the plurality of elasticity images corresponding to the received signals from the ultrasonic probe;

calculate at least a quality parameter reflecting reliability of each elasticity image of the plurality of elasticity images corresponding to the elasticity information;

identify whether a dynamic process start point frame exists in a sequence of corresponding frames of the plurality of elasticity images, wherein the dynamic process start point frame is defined as a frame with a quality parameter that meets a preset quality requirement; and in response to determining that the dynamic process start point frame exists in the sequence of corresponding frames of the plurality of elasticity images, obtain a current frame, wherein the current frame is any frame behind the dynamic process start point frame;

determine whether the quality parameter of the current frame meets the preset quality requirement, and determine, according to a determination result, whether to weight the current frame and a previous frame and output a weighted result, wherein the display device is further configured to display the weighted result when it is determined to output the weighted result of the current frame and the previous frame.

9. The system for ultrasound elastography according to claim 8, wherein when it is determined that the dynamic process start point frame exists in the sequence of corresponding frames of the plurality of elasticity images, the processor is further configured to:

accumulate a number of consecutive bad frames, the number of consecutive bad frames being defined as the number of consecutive frames with quality that fails to satisfy the preset quality requirement; and weight the current frame and the previous frame and output the weighted result when it is determined that the quality parameter of the current frame meets the preset quality requirement.

10. The system for ultrasound elastography according to claim 9, wherein it is determined that the quality parameter of the current frame fails to meet the preset quality requirement after determining the existence of the dynamic process start point frame, the process is further configured to:

determine whether the number of consecutive bad frames reaches a preset threshold;

invalidate the dynamic process start point frame, clear the number of consecutive bad frames and refrain from outputting the current frame when the number of consecutive bad frames reaches the preset threshold; and output the previous frame when the number of consecutive bad frames does not reach the preset threshold.

11. The system for ultrasound elastography according to claim 8, wherein when it is determined that no dynamic process start point frame exists, the processor is further configured to:

determine whether the quality parameter of the current frame meets the preset quality requirement;

refrain from outputting the current frame when the quality parameter of current frame fails to meet the preset quality requirement; and output the current frame as a corresponding elasticity image and set the current frame as the dynamic process start point frame when the quality parameter of the current frame meets the preset quality requirement.

12. The system for ultrasound elastography according to claim 8, wherein the quality parameter comprises at least one of a deformation degree parameter and a cross correlation detecting quality parameter; the deformation degree parameter is an average strain value corresponding to the current frame; the cross correlation detecting quality parameter is a score of the current frame acquired by a corresponding scoring rule selected by a method of displacement detection adopted in the processor.

13. The system for ultrasound elastography according to claim 12, wherein the method of displacement detection adopted in the processor refers to a sum of absolute difference (SAD), the score is computed by:

calculating a first score, wherein the first score is configured for evaluating a distance between a maximal SAD value of a position within a current search area and an upper limit of a distribution of SAD values;

calculating a second score, wherein the second score is configured for evaluating a distance between a minimal SAD value of a position within the current search area and a lower limit of the distribution of the SAD values;

weighting the first score and the second score, and taking a weighted score as a quality score of current search; and averaging quality scores of all sampling positions of the current frame, and obtaining a final quality score of the current frame.

14. The system for ultrasound elastography according to claim 13, wherein the first score is calculated as:

score1=(SAD_max−SAD_min)/(SAD_High−SAD_min), the second score is calculated as:

score2=(SAD_max−SAD_min)/(SAD_max−SAD_Low), the first score and the second score are weighted as:

score_SAD=score1*p+score2*(1−p), wherein score1 is the first score, score2 is the second score, SAD_max is the maximal SAD value of the current search area, SAD_min is the minimal SAD value of the current search area, SAD_High is the upper limit of the distribution of the SAD values preset by the system, SAD_Low is the lower limit of the distribution of the SAD values preset by the system, score_SAD is the quality score of the current search, p is a weighting coefficient preset by the system.

15. A system for ultrasound elastography, comprising an elasticity processing apparatus for performing an elasticity process on received signals; the elasticity processing apparatus comprising:

an elasticity information detecting module for extracting elasticity information representing an elasticity of a target to be detected from a plurality of elasticity images corresponding to the received signals from an ultrasonic probe;

a quality parameter calculating module for calculating at least a quality parameter reflecting quality of each elasticity image of the plurality of elasticity images corresponding to the elasticity information;

a start point judging unit for identifying whether a dynamic process start point frame exists in a sequence of corresponding frames of the plurality of elasticity images, wherein the dynamic process start point frame is a frame with the quality parameter that meets a preset quality requirement; and a frame processing module for, in response to determining that the dynamic process start point frame exists in the sequence of corresponding frames of the plurality of elasticity images, obtaining a current frame, wherein the current frame is any frame behind the dynamic process start point frame;

determining whether the quality parameter of the current frame meets the preset quality requirement, and when the quality parameter of the current frame meets the preset quality requirement, weighting the current frame and a previous frame and outputting a weighted result.

16. The system for ultrasound elastography according to claim 15, wherein:

if no dynamic process start point frame exists, the frame processing module is further configured to:

determine whether the quality parameter of the current frame meets the preset quality requirement;

refrain from outputting the current frame if the quality parameter of current frame fails to meet the preset quality requirement;

output the current frame as a corresponding elasticity image if the quality parameter of the current frame meets the preset quality requirement, and wherein the current frame is regarded as the dynamic process start point frame if the quality parameter of the current frame meets the preset quality requirement.

17. The system for ultrasound elastography according to claim 15, wherein the elasticity processing apparatus further comprises:

a bad frame judging subunit for, after determining the existence of the dynamic process start point frame by the start point judging unit, accumulating a number of consecutive bad frames, the number of consecutive bad frames being defined as the number of consecutive frames with quality that fails to satisfy the preset quality requirement, under the situation that the quality parameter of the current frame does not meet the preset quality requirement, determining whether the number of consecutive bad frames reaches a preset threshold, if the number of consecutive bad frames reaches the preset threshold, invalidating the dynamic process start point frame and clearing the number of consecutive bad frames, followed with the current frame being not outputted; if the number of consecutive bad frames does not reach the preset threshold, outputting the previous frame; and a frame weighting subunit for, after determining that the quality parameter of the current frame meets the preset quality requirement by the bad frame judging subunit, clearing the number of consecutive bad frames, weighting the current frame and the previous frame, and outputting the weighted result.

18. The system for ultrasound elastography according to claim 15, wherein the quality parameter comprises at least one of a deformation degree parameter and a cross correlation detecting quality parameter; the deformation degree parameter is an average strain value corresponding to the current frame; the cross correlation detecting quality parameter is a score of the current frame acquired by a corresponding scoring rule selected by a method of displacement detection adopted in the elasticity information detecting module.

19. The system for ultrasound elastography according to claim 18, wherein the method of displacement detection adopted in the elasticity information detecting module refers to a sum of absolute difference (SAD), the score is computed by:

calculating a first score, wherein the first score is configured for evaluating a distance between a maximal SAD value of a position within a current search area and an upper limit of a distribution of SAD values;

calculating a second score, wherein the second score is configured for evaluating a distance between a minimal SAD value of a position within the current search area and a lower limit of the distribution of the SAD values;

weighting the first score and the second score, and taking the weighted result as a quality score of current search; and averaging quality scores of all sampling positions of the current frame, and obtaining a final quality score of the current frame.

20. The system for ultrasound elastography according to claim 19, wherein the first score is calculated as:

$$score1 = (SAD\_max - SAD\_min)/(SAD\_High - SAD\_min),$$

the second score is calculated as:

$$score2 = (SAD\_max - SAD\_min)/(SAD\_max - SAD\_Low),$$

weighting the first score and the second score are weighted as:

$$score\_SAD = score1 * p + score2 * (1-p),$$

wherein score1 is the first score, score2 is the second score, $SAD\_max$ is the maximal SAD value of the current search area, $SAD\_min$ is the minimal SAD value of the current search area, $SAD\_High$ is the upper limit of the distribution of the SAD values preset by the system, $SAD\_Low$ is the lower limit of the distribution of the SAD values preset by the system, $score\_SAD$ is the quality score of the current search, p is a weighting coefficient preset by the system.

* * * * *